United States Patent
Takahashi

(10) Patent No.: US 11,967,183 B2
(45) Date of Patent: Apr. 23, 2024

(54) NOTIFICATION SYSTEM AND NOTIFICATION DEVICE

(71) Applicant: OMRON Corporation, Kyoto (JP)

(72) Inventor: Daisuke Takahashi, Moriyama (JP)

(73) Assignee: OMRON Corporation, Kyoto (JP)

( * ) Notice: Subject to any disclaimer, the term of this patent is extended or adjusted under 35 U.S.C. 154(b) by 345 days.

(21) Appl. No.: 17/437,410

(22) PCT Filed: Mar. 9, 2020

(86) PCT No.: PCT/JP2020/009905
§ 371 (c)(1),
(2) Date: Sep. 8, 2021

(87) PCT Pub. No.: WO2020/195731
PCT Pub. Date: Oct. 1, 2020

(65) Prior Publication Data
US 2022/0165093 A1 May 26, 2022

(30) Foreign Application Priority Data
Mar. 27, 2019 (JP) .................................. 2019-061728

(51) Int. Cl.
*G06K 9/00* (2022.01)
*G01S 15/86* (2020.01)
*G01S 17/08* (2006.01)
*G06F 3/01* (2006.01)
*G06V 20/40* (2022.01)
(Continued)

(52) U.S. Cl.
CPC .............. *G06V 40/25* (2022.01); *G01S 15/86* (2020.01); *G01S 17/08* (2013.01); *G06F 3/016* (2013.01); *G06V 20/44* (2022.01); *G08B 21/02* (2013.01); *G06V 2201/07* (2022.01)

(58) Field of Classification Search
CPC .................................................. G06V 2201/07
See application file for complete search history.

(56) References Cited

U.S. PATENT DOCUMENTS 6,250,255 B1 6/2001 Lenhardt et al.
2007/0093709 A1* 4/2007 Abernathie ............ A61B 90/39
600/407

(Continued)

FOREIGN PATENT DOCUMENTS

| CN | 101929839 | 12/2010 |
| CN | 101995219 | 3/2011 |

(Continued)

OTHER PUBLICATIONS

English translation of WO2018084082 (Year: 2018).*

(Continued)

*Primary Examiner* — Hadi Akhavannik
(74) *Attorney, Agent, or Firm* — JCIPRNET

(57) ABSTRACT

This notification device (100) of a notification system (10) detects a portion of the body of a person from distance information from a proximity sensor (110) and image information from an image sensor (120) when an approaching object is a person, and causes an ultrasonic irradiation device (130) to irradiate the detected portion of the body of the person with ultrasonic waves that can generate tactile sensation.

8 Claims, 7 Drawing Sheets

(51) Int. Cl.
*G06V 40/20* (2022.01)
*G08B 21/02* (2006.01)

(56) References Cited

U.S. PATENT DOCUMENTS

| | | | | |
|---|---|---|---|---|
| 2010/0014750 | A1* | 1/2010 | Seko | G06T 7/73 |
| | | | | 382/154 |
| 2012/0274466 | A1 | 11/2012 | Mezger | |
| 2013/0278631 | A1* | 10/2013 | Border | G06Q 30/02 |
| | | | | 345/633 |
| 2015/0123919 | A1* | 5/2015 | Yamada | G06F 3/017 |
| | | | | 345/173 |
| 2016/0357264 | A1* | 12/2016 | Tissot | G06F 3/017 |
| 2017/0243617 | A1* | 8/2017 | Lee | G11B 27/031 |
| 2017/0262062 | A1* | 9/2017 | Wakuda | G06F 3/017 |
| 2018/0350212 | A1 | 12/2018 | Hirakawa | |
| 2019/0042851 | A1* | 2/2019 | Varadarajan | G06V 40/20 |
| 2021/0250410 | A1* | 8/2021 | Park | H04L 67/62 |
| 2022/0165093 | A1* | 5/2022 | Takahashi | G08B 21/02 |

FOREIGN PATENT DOCUMENTS

| | | |
|---|---|---|
| JP | 2001506369 | 5/2001 |
| JP | 2008018896 | 1/2008 |
| JP | 6364568 | 7/2018 |
| WO | 2007088630 | 8/2007 |
| WO | 2017155126 | 9/2017 |
| WO | 2017203937 | 11/2017 |
| WO | 2018084082 | 5/2018 |
| WO | 2018088146 | 5/2018 |
| WO | 2018215047 | 11/2018 |

OTHER PUBLICATIONS

"Office Action of Japan Counterpart Application" with English translation thereof, dated May 10, 2022, p. 1-p. 6.

"Search Report of Europe Counterpart Application", dated Oct. 28, 2022, p. 1-p. 9.

"International Search Report (Form PCT/ISA/210) of PCT/JP2020/009905," dated Apr. 7, 2020, with English translation thereof, pp. 1-5.

"Written Opinion of the International Searching Authority (Form PCT/ISA/237) of PCT/JP2020/009905," dated Apr. 7, 2020, with English translation thereof, pp. 1-8.

"Office Action of Japan Counterpart Application" with English translation thereof, dated Feb. 1, 2022, p. 1-p. 6.

"Office Action of China Counterpart Application" with English translation thereof, dated Jun. 2, 2022, p. 1-p. 25.

* cited by examiner

NOTIFICATION SYSTEM AND NOTIFICATION DEVICE

CROSS-REFERENCE TO RELATED APPLICATION

This application is a 371 application of the International PCT application serial no. PCT/JP2020/009905, filed on Mar. 9, 2020, which claims the priority benefits of Japan Patent Application No. 2019-061728, filed on Mar. 27, 2019. The entirety of each of the above-mentioned patent applications is hereby incorporated by reference herein and made a part of this specification.

BACKGROUND

Technical Field

The present invention relates to a notification system and a notification device.

Related Art

In factories, work sites, and the like, a work robot and other mechanical equipment are operated, and an area where there is a risk of danger when a person enters is defined as a dangerous area and is distinguished from other areas. In order to prevent a person from approaching the dangerous area, the dangerous area is displayed by visual means such as a billboard, a sign, and the like. In addition, Patent literature 1 discloses a conventional technique for projecting a safety sign by a projector.

Furthermore, there is also known a monitoring system that makes an emergency stop of mechanical equipment when a person enters a dangerous area.

On the other hand, Patent literature 2 proposes a warning device for vehicle that gives a warning to a pedestrian by tactile stimulus by means of emitting air.

LITERATURE OF RELATED ART

Patent Literature

Patent literature 1: Japanese Patent No. 6364568
Patent literature 2: Japanese Patent Laid-Open No. 2008-18896

SUMMARY

Problems to be Solved

Emergency shutdown of mechanical equipment by a monitoring system when a person inadvertently enters a dangerous area will enhance safety, but also will reduce device utilization and factory productivity, and cause damage to a work-in-progress in some cases.

Thus, in order to avoid this situation, it is conceivable to build a system that, when a person is detected to approach a dangerous area, issues a warning to the person (the approaching person) to prevent the person from entering the dangerous area. As a method for notifying a warning in a factory, a visual means such as turning-on of a warning light or the like, or an auditory means such as sounding of an alarm sound or the like is usually used.

However, in the factory, various pieces of mechanical equipment use means such as the turning-on of a warning light, and the sounding of an alarm sound or the like, for a signal to inform a worker of the end of a process, a notification for encouraging replenishment of raw materials, and a notification of various other events. Thus, when the warning of approaching the dangerous area is given by the visual or auditory means, there is a fear that the worker may not notice the warning.

In addition, if a field of vision is obstructed when the worker is carrying a load or in other cases, the visual means is not effective. When a noise in the factory is loud, the auditory means is not effective. These means are also not effective when an attention of the worker is reduced.

Conversely, if a level of stimulation of the visual or auditory means is increased in order to make the approaching person to the dangerous area notice the warning, the approaching person and other workers may be startled, and troubles such as work mistakes, dropping of holdings, and the like may be caused.

Thus, the present inventor has investigated a method of giving a warning by tactile stimulus rather than by the visual or auditory means. However, there is a problem that members and tools are blown off when the method by means of emitting air as disclosed in Patent literature 2 is used to handle particularly lightweight members or tools, such as seats, minute parts, and the like, and the method is not suitable for adoption in the factory.

In one aspect, the present invention has been made in view of this circumstance, and an objective of the present invention is to realize a notification system that can appropriately and effectively make an approaching person recognize a warning when the person approaches a dangerous area in a factory or the like.

Means to Solve Problems

The present invention adopts the following configuration in order to solve the problems described above.

A notification system according to one aspect of the present invention includes: a proximity sensor that detects an approach of an object to a predetermined area; an image sensor that captures an image; an ultrasonic irradiation device that remotely irradiates a portion of a body of a person with an ultrasonic wave that can generate a tactile sensation; and a notification device equipped with a proximity sensor control unit, an image sensor control unit, a person detection unit, and an ultrasonic irradiation control unit. The proximity sensor control unit acquires distance information to the object from the proximity sensor; the image sensor control unit acquires image information of the object from the image sensor; when the object approaching the predetermined area within a predetermined range is a person, the person detection unit detects a portion of a body of the person from the distance information and the image information; and the ultrasonic irradiation control unit causes the ultrasonic irradiation device to irradiate the portion of the body of the person detected by the person detection unit with the ultrasonic wave.

A notification device according to one aspect of the present invention includes a proximity sensor control unit, an image sensor control unit, a person detection unit, and an ultrasonic irradiation control unit. The proximity sensor control unit acquires distance information to an object from a proximity sensor that detects an approach of the object to a predetermined area; the image sensor control unit acquires image information of the object from an image sensor that captures an image; when the object approaching the predetermined area within a predetermined range is a person, the person detection unit detects a portion of a body of the person from the distance information and the image information; and the ultrasonic irradiation control unit causes an ultrasonic irradiation device, which remotely irradiates a portion of a body of a person with an ultrasonic wave that can generate a tactile sensation, to irradiate the portion of the body of the person detected by the person detection unit with the ultrasonic wave.

Effect

According to the notification system or the notification device according to one aspect of the present invention, it is possible to realize a notification system that can appropriately and effectively make an approaching person recognize a warning when the person approaches a predetermined area such as a dangerous area or the like in a factory or the like.

DESCRIPTION OF THE EMBODIMENTS

Embodiment 1

Hereinafter, an embodiment according to one aspect of the present invention (hereinafter, also referred to as "the embodiment") are described with reference to the drawings.

§ 1 Application Example

An example of a case where the present invention is applied is described with reference to FIG. 1.

Figure 1:
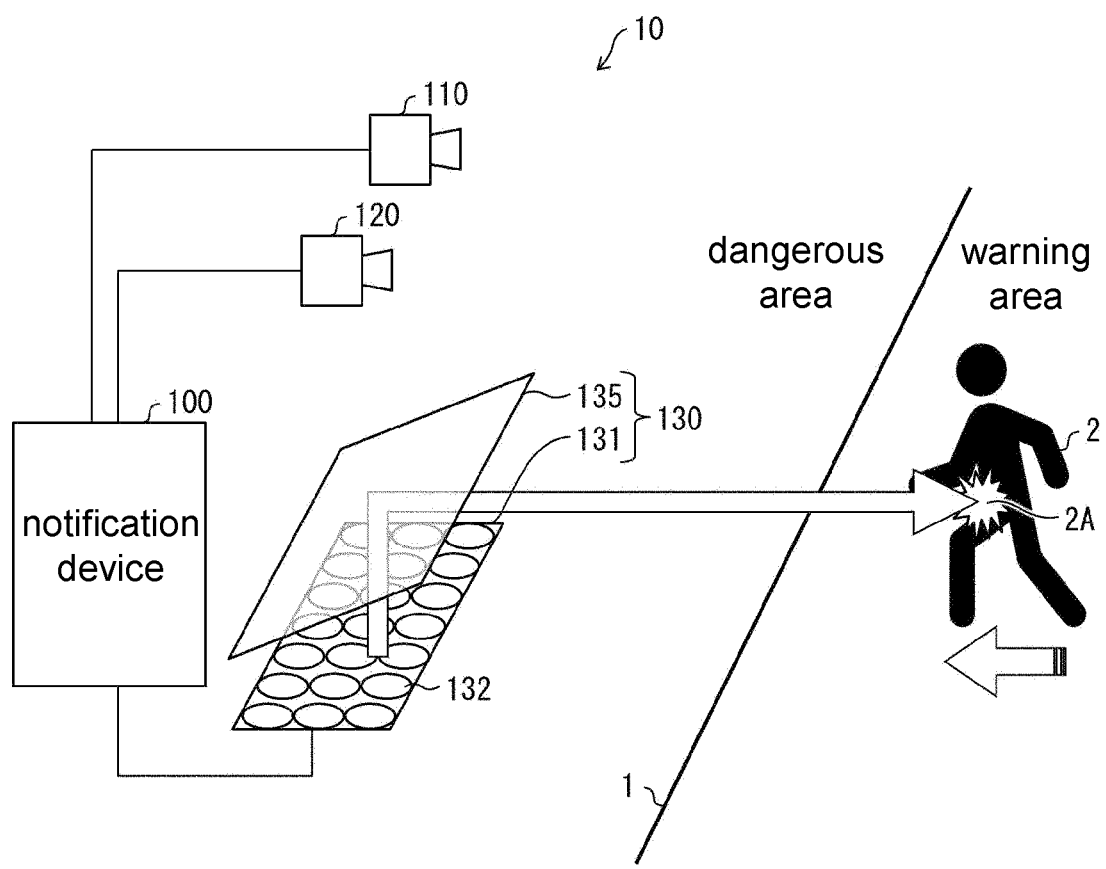
FIG. 1 is a schematic view showing a notification system according to Embodiment 1 of the present invention.

FIG. 1 is a schematic view showing an overall device configuration of a notification system 10 according to the embodiment. The notification system 10 includes a notification device 100, a proximity sensor 110, an image sensor 120, and an ultrasonic irradiation device 130 according to the embodiment.

In the embodiment, an example in which the notification system 10 includes a set of proximity sensors 110 and a set of image sensors 120 is described. However, the notification system 10 may include one or more proximity sensors 110 or image sensors 120, respectively.

The proximity sensor 110 and the image sensor 120 monitor at least a warning area, which is an area near a boundary 1 that divides a predetermined area such as a dangerous area or the like, and is an area outside the predetermined area.

The proximity sensor 110 is a sensor that detects an approach (a distance) of an object to a predetermined area such as a dangerous area or the like. The image sensor 120 is a sensor that captures the warning area.

The notification device 100 is equipped with a proximity sensor control unit, an image sensor control unit, a person detection unit, and an ultrasonic irradiation control unit.

The proximity sensor control unit acquires, from the proximity sensor 110 that detects an approach of an object to a predetermined area such as a dangerous area or the like, at least distance information to the object.

The image sensor control unit acquires normal image data (image information) from the image sensor 120 that captures an image.

When the object approaching the predetermined area such as a dangerous area or the like within a predetermined range is a person, the person detection unit detects a portion of a body of the person from the distance information and the image information.

The ultrasonic irradiation device 130 can remotely irradiate a portion of a body of a person with an ultrasonic wave that can generate a tactile sensation.

The ultrasonic irradiation control unit causes the ultrasonic irradiation device 130 to irradiate the portion of the body of the person detected by the person detection unit with the ultrasonic wave.

With the above configuration, it is possible to realize a notification system that can appropriately and effectively make an approaching person recognize a warning when the person approaches a dangerous area in a factory or the like.

§ 2 Configuration Example

A specific configuration example and an operation of the notification system 10 or the notification device 100 are described with reference to FIGS. 1 to 3.

Figure 2:
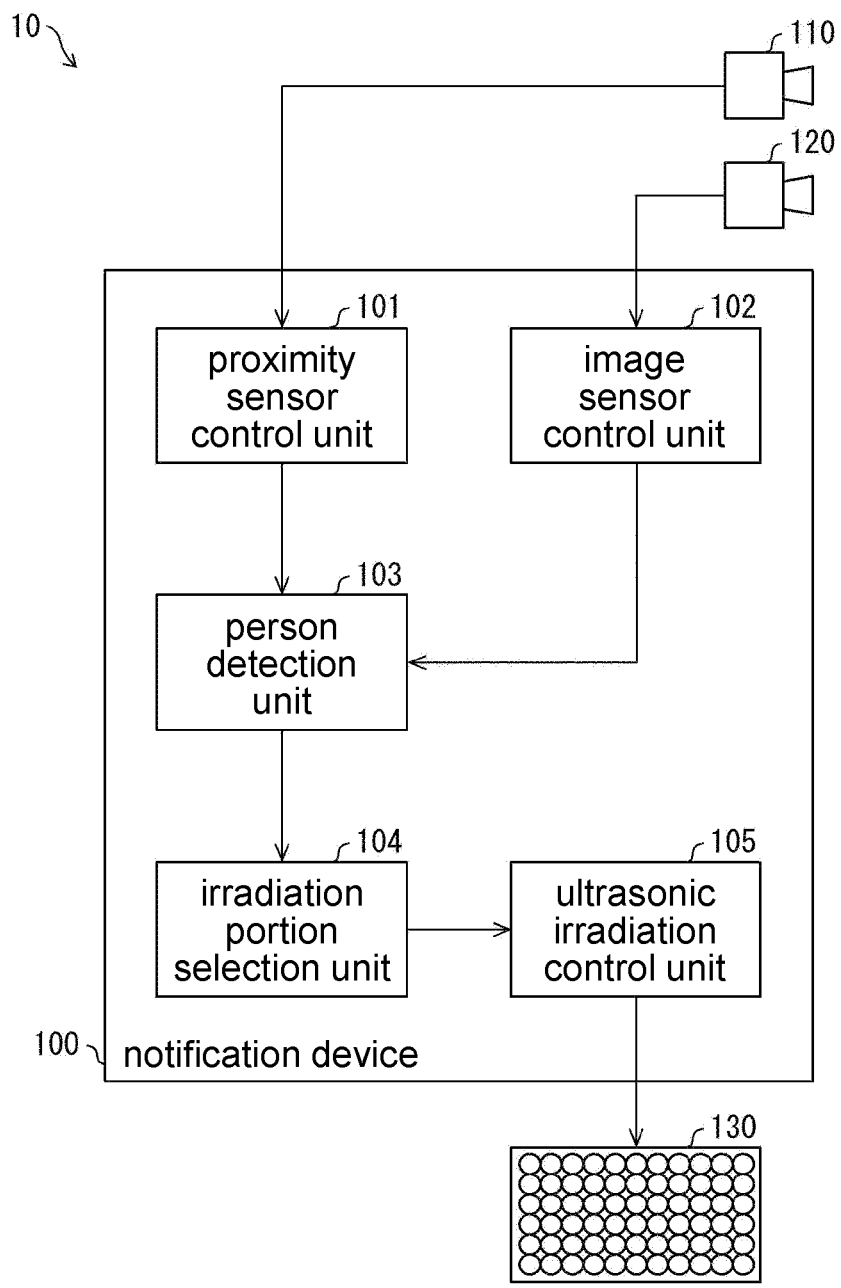
FIG. 2 is a diagram showing a configuration of a notification device according to Embodiment 1 of the present invention.

FIG. 2 is a diagram showing an internal configuration of the notification device 100 according to Embodiment 1 by functional blocks.

The notification device 100 is equipped with a proximity sensor control unit 101, an image sensor control unit 102, a person detection unit 103, and an ultrasonic irradiation control unit 105 as functional blocks. Preferably, the notification device 100 is further equipped with an irradiation portion selection unit 104.

The proximity sensor 110 monitors at least the warning area near the dangerous area where the approach of a person should be warned in a safe area which is an area outside the dangerous area. The image sensor 120 also monitors at least the warning area.

The proximity sensor 110 may be a distance sensor using triangular measurement by infrared rays or other light, a distance sensor using time of flight (ToF) of the infrared rays or other light, a distance sensor measuring a distance to an object using reflection time of ultrasonic waves, or other distance sensors. When the ultrasonic wave is used, the proximity sensor 110 is desirable to have a configuration that corrects a measurement error of the distance due to a temperature, and a configuration that does not interfere with the ultrasonic wave used to give a tactile sensation to a portion of a body of a person.

In addition, the proximity sensor 110 may be a sensor capable of acquiring distance image data. Here, the distance image data is data that represents each point in a sensor field of view as an image showing a distance to an object existing in that direction.

Examples of the sensor capable of acquiring the distance image data include a ToF camera and a stereo camera. In addition, a sensor capable of acquiring the distance image data using a monocular camera that estimates a distance from a difference in blur due to color (for example, "Color aperture imaging technology that can precisely measure a distance from a single image captured by a monocular camera: Tadashi Mishima, Takayuki Sasaki, Toshiba Review, Vol. 73, No. 1, pp. 39-43") is also included. In this case, it is preferable that an infrared image is also used to increase a chromatic aberration to further improve the precision.

The image sensor 120 can use a camera or a movie. Here, the normal image data refers to all image data which is captured by a camera or a movie and allows the shape of an object to be recognized. The normal image data is preferably a RGB image, but may also be a black-and-white image or an infrared image. The normal image data may be an image in which information other than color and brightness is superimposed on a surface of an object as long as the shape of the object can be recognized in the image.

When the proximity sensor 110 is a sensor that is also capable of acquiring the normal image data, the image sensor 120 may also be used as the proximity sensor 110. For example, some ToF cameras can output both the normal image data (particularly the RGB image) and the distance image data. In addition, many stereo cameras also can output both the normal image data (particularly the RGB image) and the distance image data.

In this case, although a sensor is integrated, the sensor itself has functions of the proximity sensor 110 and the image sensor 120. Thus, the proximity sensor control unit 101 acquires the distance information to the object from a function unit serving as the proximity sensor 110 of the integrated sensor. The image sensor control unit 102 acquires the image information from a function unit serving as the image sensor 120 of the integrated sensor.

Alternatively, the proximity sensor may be a light curtain.

As a specific example in the configuration example, the proximity sensor 110 is a ToF camera capable of acquiring the distance image data.

As shown in FIG. 1, the ultrasonic irradiation device 130 includes an ultrasonic irradiation array 131 in which a large number of ultrasonic generation elements 132 are arrayed two-dimensionally, and a reflective plate 135 that changes an orientation of a propagation direction of ultrasonic waves generated by the ultrasonic irradiation array 131. Moreover, the ultrasonic irradiation device 130 does not necessarily include the reflective plate 135, and may directly irradiate a subject with an ultrasonic wave from the ultrasonic irradiation array 131.

The ultrasonic irradiation device 130 that irradiates a predetermined position with an ultrasonic wave that can cause a tactile sensation in a portion of a body of a person can be configured by a known technique (for example, Japanese Patent Laid-Open No. 2012-48378).

In the ultrasonic irradiation device 130, the ultrasonic irradiation array 131 constitutes a phased array including a large number of ultrasonic generation elements 132. By adjusting the phase of ultrasonic waves generated by the respective ultrasonic generation elements 132, the ultrasonic irradiation device 130 can concentrate and irradiate the ultrasonic waves at a desired remote position. In addition, it is also possible to scan the position where the ultrasonic waves are concentrated in a desired direction.

If a skin of a person is at the position where the ultrasonic waves are concentrated, a tactile receptor of the skin is stimulated, and a tactile sensation is induced at the irradiation position. The ultrasonic irradiation device 130 can also give various tactile sensations by changing an intensity of the ultrasonic waves over time.

Figure 3:
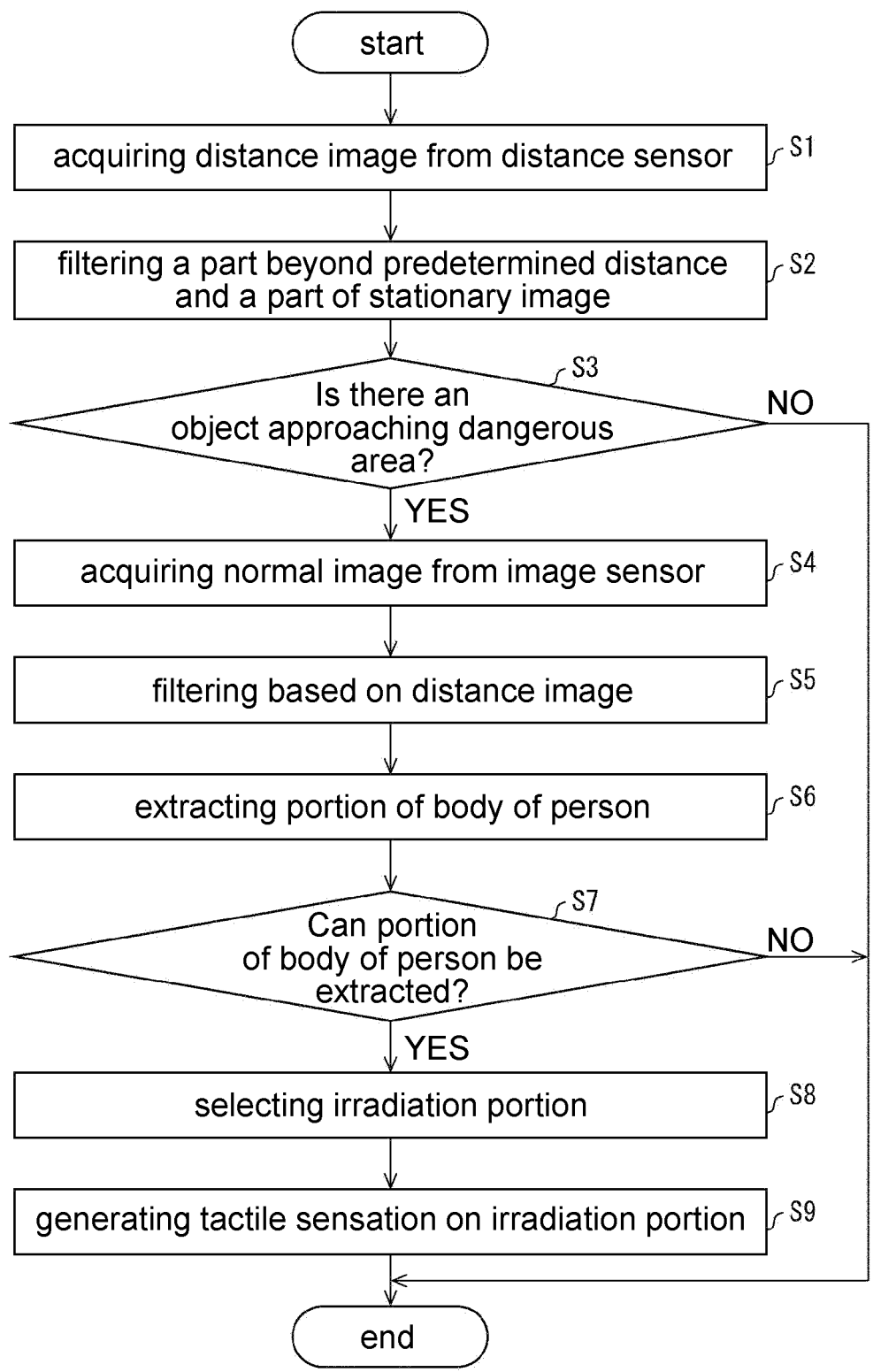
FIG. 3 is a flowchart for describing an operation of the notification device according to Embodiment 1 of the present invention.

FIG. 3 is a flowchart showing an operation of the notification device 100. Hereinafter, the operation of the notification device 100 is shown, and the configuration of the notification system 10 or the notification device 100 is described in more detail.

(Step S1)

In step S1, the proximity sensor control unit 101 acquires the distance image data from the proximity sensor 110 (the ToF camera).

(Step S2)

Subsequently, in step S2, the proximity sensor control unit 101 filters and removes a part beyond a predetermined distance corresponding to an area further outside the warning area as unnecessary information from the distance image data.

In addition, a part of a stationary image (fixed fixtures, fixed mechanical equipment, and the like), which is a part of the distance image data where there is no movement, is filtered and removed as being a background image.

By filtering in this way, only an image of an object having a movement in the warning area is extracted, and unnecessary information is removed.

(Step S3)

Subsequently, in step S3, the proximity sensor control unit 101 judges whether there is an object approaching the dangerous area (the distance becomes smaller over time) in the filtered distance image data. If it is judged that there is an object (YES in step S3), the flow proceeds to the next step S4, and if it is judged that there is no object (NO in step S3), the flow ends.

(Step S4)

In step S4, the image sensor control unit 102 acquires the normal image data from the image sensor 120.

(Step S5)

Subsequently, in step S5, the person detection unit 103 acquires the filtered distance image data from the proximity sensor control unit 101, and acquires the normal image data from the image sensor control unit 102.

Next, the person detection unit 103 filters an area of the normal image data corresponding to the filtered area in the distance image data. The purpose is to remove unnecessary information and reduce a burden of image processing.

(Step S6)

Subsequently, in step S6, the person detection unit 103 extracts each part (portion) of a body of a person from the filtered normal image data. The portion is, for example, a head, a face, a neck, an upper arm, a lower arm, a hand, a shoulder, a back, a chest, an abdomen, a waist, a knee, or the like. However, the portion may be further subdivided.

As a method for extracting each part of a body of a person from the normal image data or the like, a known method can be used.

Specifically, as a method for detecting a portion of a body of a person from image information, a detection method using histogram of oriented gradients (HOG) (for example, with reference to "Pedestrian Detection OpenCV: https://www.pyimagesearch.com/2015/11/09/pedestrian-detection-opencv/") can be used.

Alternatively, as the method for detecting a portion of a body of a person from image information, a detection method using kinematic skeleton fitting (for example, with reference to "ACM Transactions on Graphics, Vol. 36, No. 4, Article 44 (Real-time 3D Human Pose Estimation with a Single RGB: Dushyant Mehta et al., ACM Transactions on Graphics, Vol. 36, No. 4, Article 44)") can be used.

In addition, a method for detecting a portion of a body of a person from image information (for example, with reference to "real-time pose estimation from a single distance image (Real-Time Human Pose Recognition in Parts from Single Depth Images: Jamie Shotton et al., https://www.microsoft.com/en-us/research/wp-content/uploads/2016/02/BodyPartRecognition.pdf)") may be used.

Furthermore, in detecting a portion of a body of a person, a detection of exposed portions such as hands and a face using changes in skin color due to changes in pulse (for example, with reference to "video pulse wave extraction technology (https://www.cac.co.jp/product/rhythmiru/)") may be used as an auxiliary, or the above methods may be used in combination.

In the configuration example, a detection method using HOG from the normal image data which is a RGB image is applied.

(Step S7)

Subsequently, in step S7, the person detection unit 103 judges whether a portion of a body of a person has been extracted. When it is judged that the portion has been extracted (YES in step S7), the flow proceeds to the next step S8, and when it is judged that the portion is not extracted (NO in step S7), the flow ends.

(Step S8)

In step S8, the irradiation portion selection unit 104 acquires the portion of the person extracted from the person detection unit 103 and a position thereof (direction, distance).

Next, the irradiation portion selection unit 104 selects a portion to which the ultrasonic wave is actually irradiated (an irradiation portion) from the extracted portion of the person according to a priority order determined previously.

For example, because it may be inappropriate for a hand to feel a tactile sensation when the hand is carrying things or working, the hand is considered to be lowered in the priority order or not irradiated. In addition, because a face may invite an avoidance action such as closing eyes, turning away from the face, or the like, the face is also considered to be lowered in the priority order or not irradiated.

In the configuration example, a waist, a shoulder, an elbow, a knee, and a head are used as the irradiation portion in descending order of priority.

(Step S9)

Subsequently, in step S9, the ultrasonic irradiation control unit 105 acquires information of the selected irradiation portion and a position thereof (direction, distance) from the irradiation portion selection unit 104.

Next, the ultrasonic irradiation control unit 105 controls the ultrasonic irradiation device 130 to irradiate the irradiation portion with the ultrasonic wave that can give a tactile sensation.

For example, when the waist is selected as the irradiation portion, as schematically shown in FIG. 1, the ultrasonic irradiation control unit 105 causes the ultrasonic irradiation device 130 to irradiate ultrasonic waves according to the acquired position information in a manner that the ultrasonic waves are concentrated on a waist 2A of an approaching person 2 to the dangerous area. Then, the notification system 10 causes a tactile sensation on the waist 2A of the approaching person 2. In this way, the notification system 10 executes a warning to the approaching person to the dangerous area.

The notification device 100 repeatedly executes the above series of flows at a determined monitoring interval.

§ 3 Action and Effect

According to the notification system 10 or the notification device 100 according to the embodiment, a warning that a person is approaching a predetermined area such as a dangerous area or the like can be given by a tactile means other than the visual means or the auditory means. Thus, unlike the case where only the visual means and the auditory means are used, the warning is not overlooked by the approaching person 2 and can be effectively recognized.

Particularly in factories, when various pieces of mechanical equipment use various visual and auditory means such as the turning-on of a warning light and the sounding of an alarm sound or the like in order to notify various events, the warning can also be effectively recognized by the approaching person 2.

In addition, the warning can also be effectively recognized when the field of vision is obstructed in a case where an approaching person is carrying a load or in other cases, and when the attention is reduced.

In giving a warning, there is no fear of unnecessarily startling an approaching person and no fear of blowing off members and tools in a process, and there is also no inappropriate impact on the production process.

In remotely generating a tactile sensation on a portion of a body of the approaching person 2, the notification system 10 senses a position (a distance and a direction) of the portion of the body by the proximity sensor 110 and the image sensor 120. In addition, the notification system 10 irradiates the ultrasonic wave that can generate a tactile sensation by the ultrasonic irradiation device 130 using the ultrasonic irradiation array 131. Therefore, an area where the ultrasonic waves are concentrated can be made to accurately follow the portion of the body of the moving approaching person 2 to generate a tactile sensation.

§ 4 Specific Example of Irradiation Method

Hereinafter, a more specific application example of the operation is shown.

In order not to unnecessarily startle the approaching person 2, it is desirable to create a tactile sensation of intermittently tapping with a light force, particularly at the beginning.

For example, a force of about 100 to 300 g weight is applied to the range of a diameter of 2 to 5 cm on the body surface for about 0.1 second, which is repeated at an appropriate cycle.

It is also desirable to make the tactile sensation more forceful as the approaching person 2 approaches the dangerous area, or to cause the portion in which the tactile sensation is generated to be continuously or discretely moved within a certain area. In addition, it is also desirable to shorten the intermittent cycle as the approaching person 2 approaches the dangerous area. This is because the closer to the dangerous area, the higher the degree of stimulation, so that the approaching person is more aware of the warning and is more effectively deterred from entering the dangerous area.

As an example, it is conceivable to adjust the cycle in inverse proportion to a remaining distance to the dangerous area. Initially, when the approaching person 2 approaches 1 m to the dangerous area, a stimulus with a cycle of 0.25 second is given. If the remaining distance is 80 cm, the cycle is shortened to 0.2 second, and if the remaining distance is 60 cm, the cycle is shortened to 0.15 second.

It may be an option to shift from intermittent irradiation (an intermittent tactile sensation) to continuous irradiation (a continuous tactile sensation) to give a stronger warning when the approaching person 2 gets very close to the dangerous area.

Embodiment 2

Other embodiments of the present invention are described below. Note that, for convenience of description, constituent elements having the same functions as the constituent elements described in the above embodiment are denoted by the same reference signs, and descriptions thereof are not repeated.

A notification system and a notification device according to Embodiment 2 have the same configuration as that of Embodiment 1. In Embodiment 2, an operation when a worker carrying a load approaches a dangerous area is shown.

Figure 4:
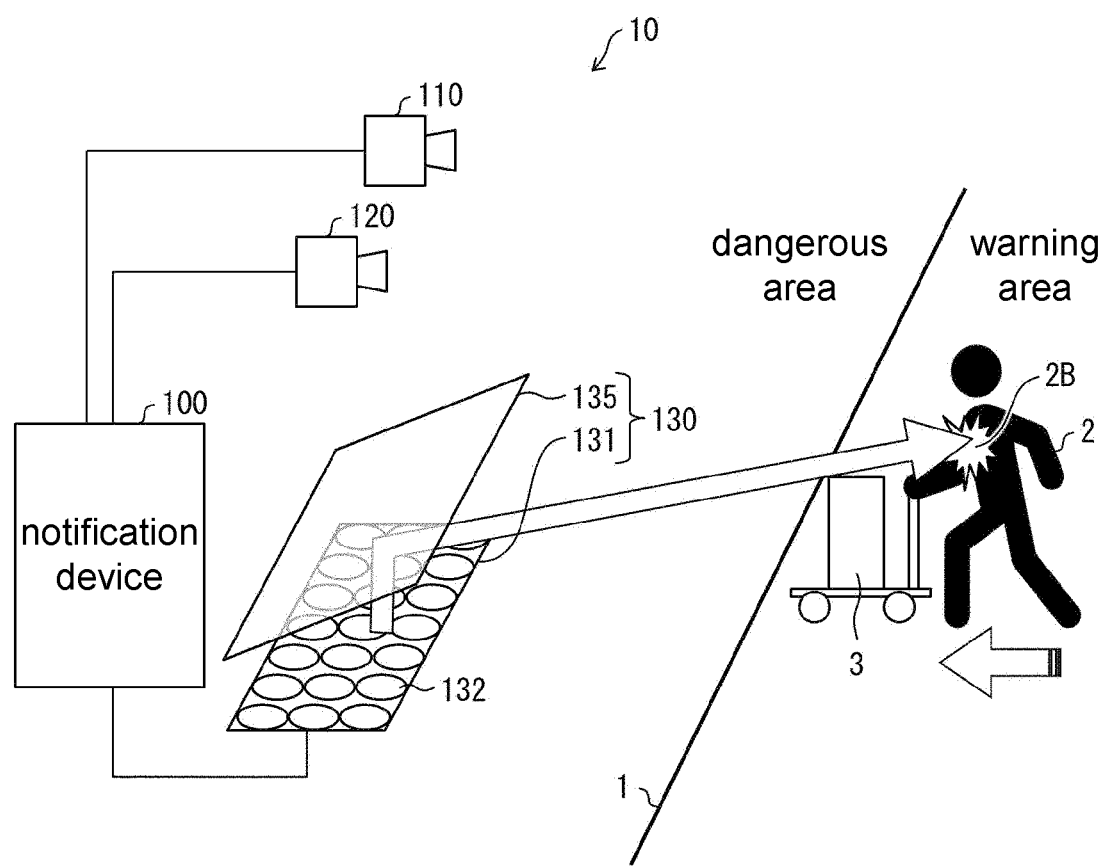
FIG. 4 is a schematic diagram for describing an example of operations of the notification system and the notification device according to Embodiment 1 of the present invention.

FIG. 4 is a diagram showing a schematic configuration of the notification system 10 in Embodiment 2 and the approaching person 2 to the dangerous area. As shown in the diagram, the approaching person 2 is approaching the dangerous area while pushing a trolley 3 on which a load is mounted.

From the notification system 10 (the proximity sensor 110 and the image sensor 120) side, the waist of the approaching person 2 is hidden by the trolley 3 on which a load is mounted and cannot be seen. Then, in step S6 of FIG. 3, the waist of the approaching person 2 is not extracted as a portion of a body. However, other portions such as the shoulder and the like are extracted.

Then, in step S8, the shoulder having a high priority next to the waist is selected as a selection portion.

Then, in step S9, a shoulder 2B of the approaching person 2 is irradiated with the ultrasonic wave that can generate a tactile sensation.

As shown in the embodiment, even when a certain portion of the body is hidden and the ultrasonic wave cannot be irradiated in a situation where the worker is carrying a load or other situations, the notification device 100 operates to acknowledge each portion of the body. Thus, in the notification system 10 and the notification device 100, the warning can be reliably recognized by the approaching person 2 to the dangerous area even in the above case.

Embodiment 3

The notification system and the notification device according to Embodiment 2 have the same configuration as that of Embodiment 1, but the proximity sensor 110 which is specifically a ToF camera in the configuration example in Embodiment 1 is replaced with a light curtain.

Figure 5:
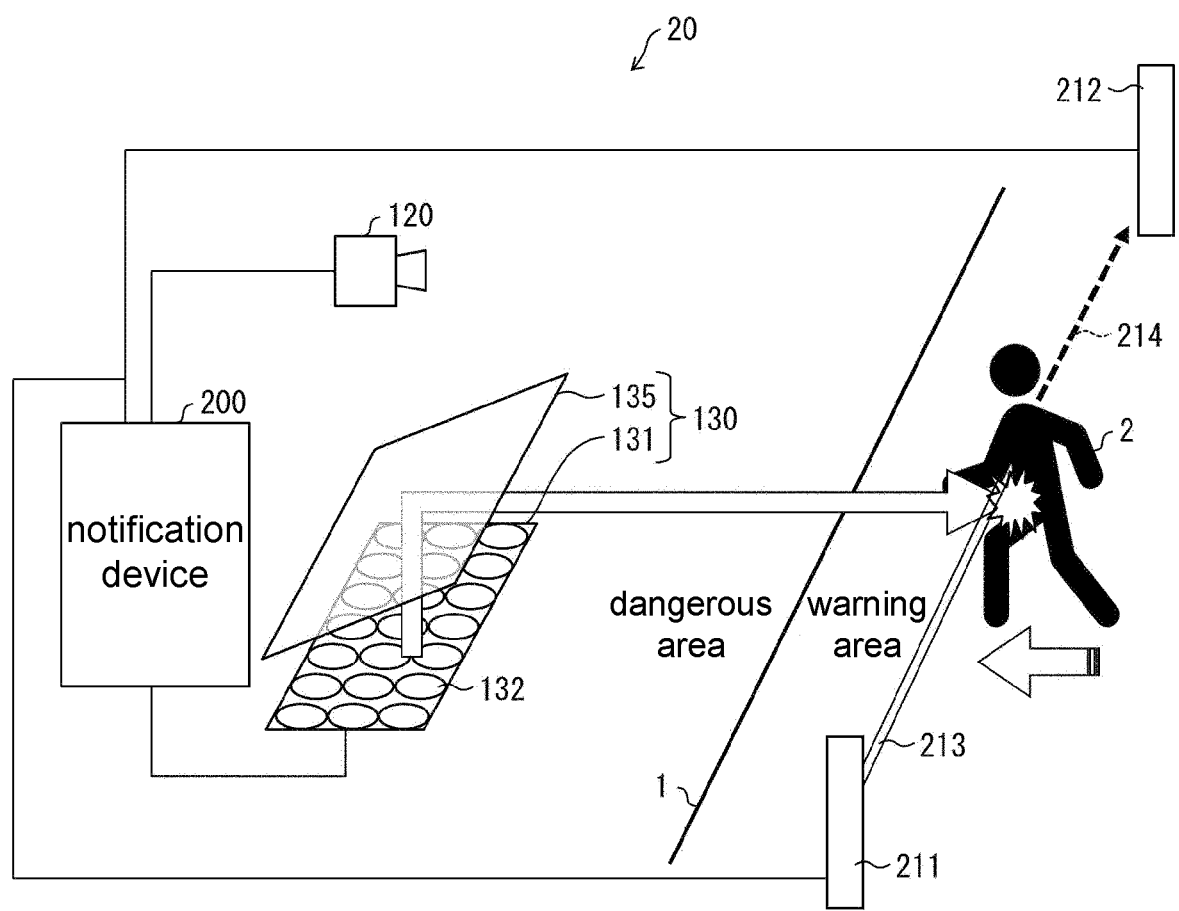
FIG. 5 is a schematic view showing a notification system according to Embodiment 2 of the present invention.

FIG. 5 is a diagram showing a schematic configuration of a notification system 20 according to Embodiment 3 and the approaching person 2 to the dangerous area.

In the notification system 20, a light curtain is arranged to detect when an object passes through the boundary between the warning area and the safe area outside the warning area.

The light curtain is configured by a set of a transmitter 211 and a receiver 212. The transmitter 211 is arranged on one side of the boundary, and the receiver 212 is arranged on the other side. When a light ray 213 from the transmitter 211 toward the receiver 212 is blocked and cannot reach the receiver 212 (a part of the blocked light ray is shown by a dotted line 214 in FIG. 5), the presence of an object passing through the boundary is detected.

In the notification device 200 of the notification system 20, as soon as the light curtain detects an entry into the warning area, it is considered that there is an object approaching the dangerous area. In addition, because the filtering by the distance image data in Embodiment 1 cannot be performed, a burden of processing of extracting each portion of the body from the normal image data cannot be reduced, but the warning can be notified to the approaching person 2 in the same way as the notification device 100 of Embodiment 1.

According to Embodiment 3, a function of notifying a warning by a tactile sensation can be added to the existing equipment in which the approach to the dangerous area is detected by the light curtain.

Embodiment 4

A notification system according to Embodiment 4 has the same configuration as the notification system 10 of Embodiment 1, but differs from the notification system 10 in that the notification system according to Embodiment 4 has a special function when the notification system is arranged in a site.

Figure 6:
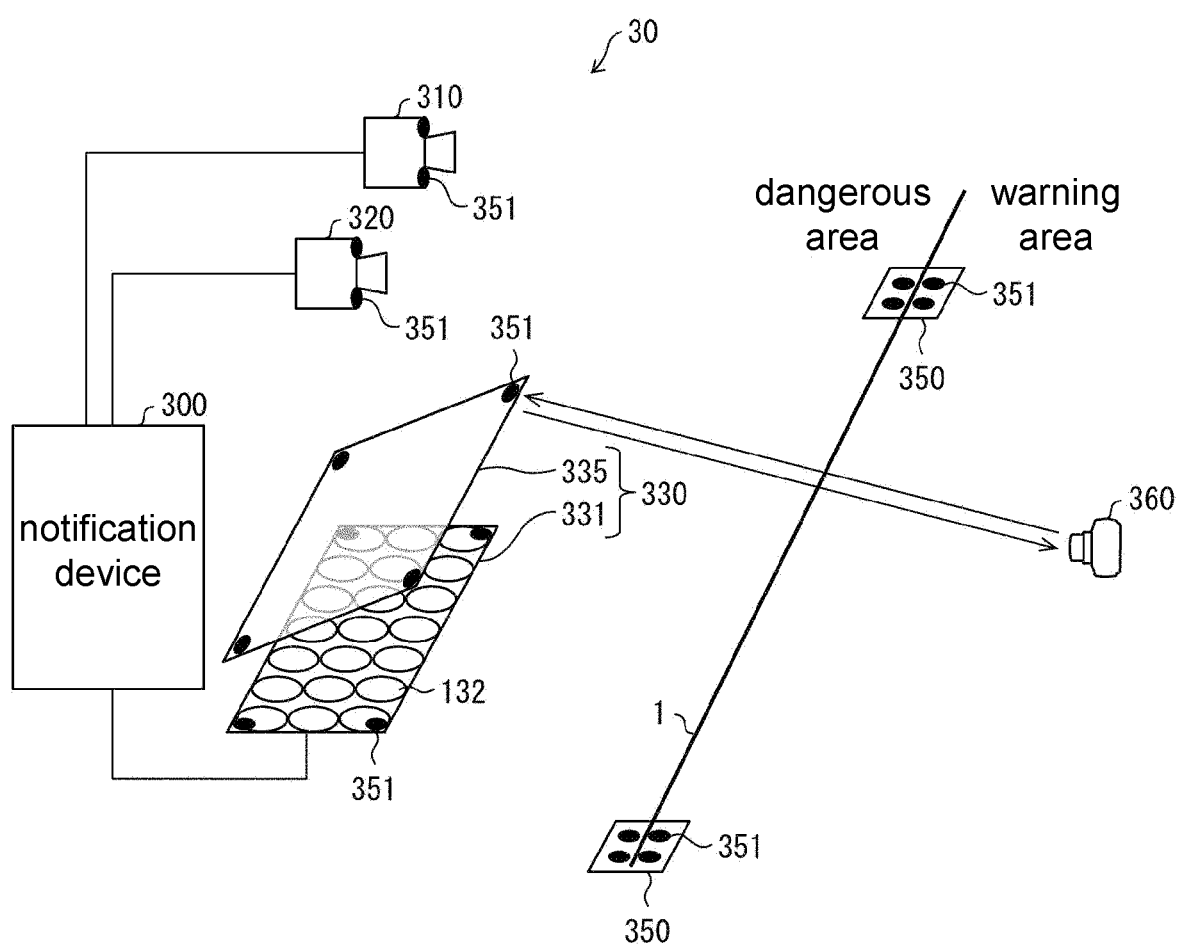
FIG. 6 is a schematic view showing a notification system according to Embodiment 3 of the present invention.

FIG. 6 is a schematic view showing a configuration of a notification system 30 according to Embodiment 4. The notification system 30 includes a notification device 300.

In the notification system 30, a proximity sensor 310, an image sensor 320, an ultrasonic irradiation array 331 of an ultrasonic irradiation device 330, and a reflective plate 335 thereof have a marker 351, respectively.

At least three markers 351 are arranged on a reference surface of each of these devices or parts. The marker 351 includes a recursive member that recursively reflects an infrared light. Specifically, the recursive member can be a corner cube or a retroreflective sheet.

Furthermore, the notification system 30 includes an infrared camera 360 having an infrared ray emitting element. The infrared camera 360 is a camera that can obtain an infrared image by a reflected light of infrared rays emitted by the infrared camera 360 itself.

Figure 7:
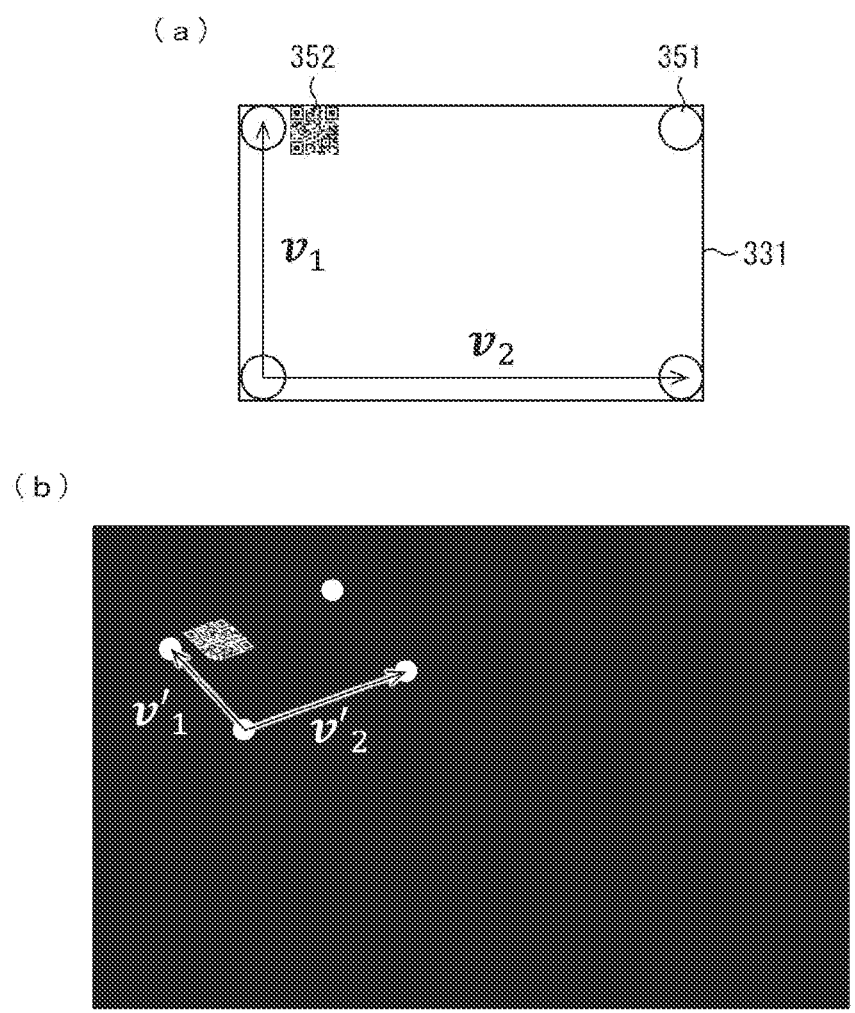
FIG. 7 is a diagram for describing a method for arranging the notification system according to Embodiment 3 of the present invention. (a) of FIG. 7 shows an ultrasonic irradiation array, and (b) of FIG. 7 is an image obtained by photographing the ultrasonic irradiation array by an infrared camera.

FIG. 7 is a diagram for describing a method for arranging the notification system 30 in the site. (a) of FIG. 7 is a diagram showing the ultrasonic irradiation array 331, and an illustration of the ultrasonic generation element 132 is omitted for simplification of the drawing.

In (a) of FIG. 7, four markers 351 are arranged on a panel surface of the ultrasonic irradiation array 331. In addition, a two-dimensional code printed with information for identifying the type of a device is also affixed to the panel surface. The marker closest to the two-dimensional code is used as a reference marker, and vectors from the reference marker to two different markers other than the reference marker determined previously are defined as a vector v1 and a vector v2, respectively.

(b) of FIG. 7 is an infrared image obtained by photographing the panel surface of the ultrasonic irradiation array 331 by the infrared camera 360. Because the marker 351 includes the recursive member, a position of the marker is clearly photographed as a bright point. In addition, information of the two-dimensional code can also be read.

(b) of FIG. 7 illustrates a vector v'1 and a vector v'2 on the infrared image corresponding to the vector v1 and the vector v2 described above. In this way, the vector v'1 and the vector v'2 can be clearly distinguished on the infrared image.

Here, a position and a posture of the panel surface as seen from the infrared camera 360 can be calculated from positions, inclinations, and sizes of the vector v'1 and the vector v'2.

More specifically, Q'=R·A·Q, where Q is an arrangement position of the marker 351 represented by the same order coordinates in a coordinate system of the device (here, the panel surface), R is a rigid body conversion that transfers a coordinate system of the device to a coordinate system of the infrared camera 360, and P is a perspective projection conversion obtained from an angle of view of the infrared camera 360. If it is considered that an equation applied to three or more markers 351 for one device is combined with Q'=R·A·Q and a distance and an angle between arrangement points of the markers 351 are invariant by the rigid body conversion R, the rigid body conversion R is obtained.

When all the markers used in the above calculation are on the same plane, two solutions are generally obtained from a single image, and thus which of the two solutions should be adopted is judged from other constraint conditions. For example, the constraint conditions include a constraint condition that the markers can be observed only from a surface of the panel surface, the use of a group of four or more markers that are not on the same plane and are specified by a plurality of infrared images from different locations, and the like.

As for devices or parts other than the ultrasonic irradiation array 331, a position and an arrangement angle with respect to the infrared camera 360 can be calculated in the same manner. In this way, a positional relationship between a plurality of devices can be calculated by comparing a relative position of the plurality of devices with the infrared camera 360.

By the above method, in the notification system 30, the arrangement positions and the arrangement angles of the proximity sensor 310, the image sensor 320, the ultrasonic irradiation array 331 of the ultrasonic irradiation device 330, and the reflective plate 335 thereof are accurately obtained by captured images of the infrared camera 360. Thus, based on the information, a position where the ultrasonic irradiation device 330 irradiates the ultrasonic wave in order to generate a tactile sensation can be easily determined.

Furthermore, as shown in FIG. 6, the notification system 30 may include a plurality of marker plates 350 in order to also grasp the boundary between the dangerous area and the safe area (the warning area) by being photographed by the infrared camera 360. The marker plate 350 is a plate-shaped or sheet-shaped member having at least three or more markers 351 on a plane. By arranging the marker plate 350 at the boundary between the dangerous area and the safe area (the warning area), a position of the boundary with respect to the notification system 30 can be easily calculated by the same method as described above.

In each of the above embodiments, a case where the proximity sensor, the image sensor, and the ultrasonic irradiation device are each one set has been described as an example. However, an application of the present invention is not limited thereto, and a plurality of the proximity sensors, the image sensors, and the ultrasonic irradiation devices may each be used. Particularly, when an area to be warned is wide or has a complicated shape, it is effective to use a plurality of the proximity sensors, the image sensors, and the ultrasonic irradiation devices.

At that time, particularly regarding the generation of the tactile sensation by the ultrasonic irradiation device, it is preferable that the ultrasonic irradiation control unit controls the ultrasonic irradiation so that the ultrasonic wave is irradiated from one ultrasonic irradiation device for one irradiation subject. The purpose is to prevent more than a predetermined stimulus from being generated to one irradiation subject.

Implementation Example by Software

Functional blocks of the notification devices 100, 200, and 300 (particularly, the proximity sensor control unit 101, the image sensor control unit 102, the person detection unit 103, the irradiation portion selection unit 104, and the ultrasonic irradiation control unit 105) may be implemented by a logic circuit (hardware) formed by an integrated circuit (an IC chip) or the like, or may be implemented by software.

In the latter case, the notification devices 100, 200, and 300 include a computer that executes an instruction of a program, which is software for implementing each function. The computer includes, for example, one or more processors and a computer-readable recording medium that stores the program. Then, in the computer, the processor reads the program from the recording medium and executes the program, and thereby the objective of the present invention is achieved. As the processor, for example, a central processing unit (CPU) can be used. As the recording medium, a "non-temporary tangible medium", for example, a read only memory (ROM) or the like, a tape, a disk, a card, a semiconductor memory, a programmable logic circuit, or the like can be used. In addition, a random access memory (RAM) for expanding the program, or the like may be further included. In addition, the program may be supplied to the computer via an arbitrary transmission medium (a communication network, a broadcast wave, or the like) capable of transmitting this program. Moreover, one aspect of the present invention can also be realized in the form of a data signal embedded in a carrier wave, in which the program is embodied by electronic transmission.

[Summary]

A notification system according to one aspect of the present invention includes: a proximity sensor that detects an approach of an object to a predetermined area; an image sensor that captures an image; an ultrasonic irradiation device that remotely irradiates a portion of a body of a person with an ultrasonic wave that can generate a tactile sensation; and a notification device equipped with a proximity sensor control unit, an image sensor control unit, a person detection unit, and an ultrasonic irradiation control unit. The proximity sensor control unit acquires distance information to the object from the proximity sensor; the image sensor control unit acquires image information of the object from the image sensor; when the object approaching the predetermined area within a predetermined range is a person, the person detection unit detects a portion of a body of the person from the distance information and the image information; and the ultrasonic irradiation control unit causes the ultrasonic irradiation device to irradiate the portion of the body of the person detected by the person detection unit with the ultrasonic wave.

According to the above configuration, a warning that a person is approaching a predetermined area such as a dangerous area or the like can be given by a tactile means other than the visual means or the auditory means. Thus, unlike the case where only the visual means and the auditory means are used, the warning is not overlooked by the approaching person and can be effectively recognized.

Particularly in factories, when various pieces of mechanical equipment use various visual and auditory means such as the turning-on of a warning light and the sounding of an alarm sound or the like in order to notify various events, the warning can also be effectively recognized by the approaching person.

In addition, the warning can also be effectively recognized when the field of vision is obstructed in a case where an approaching person is carrying a load or in other cases, and when the attention is reduced.

In giving a warning, there is no fear of unnecessarily startling an approaching person and no fear of blowing off members and tools in a process, and there is also no inappropriate impact on the production process.

In the notification system according to one aspect, the notification device may be further equipped with an irradiation portion selection unit, and the irradiation portion selection unit may select, from a plurality of portions of the body of the person detected by the person detection unit, the portion of the body of the person to be irradiated with the ultrasonic wave by the ultrasonic irradiation device according to a priority order determined previously.

According to the above configuration, a more desirable portion of the body can be selected, which allows the approaching person to appropriately and effectively recognize the warning even when a part of the approaching person is hidden by an obstacle.

In the notification system according to one aspect, the ultrasonic irradiation control unit may cause the ultrasonic irradiation device to intermittently generate the ultrasonic wave, and thereby intermittently generate a tactile sensation in the portion of the body of the person.

According to the above configuration, a possibility of startling the approaching person can be suppressed, and the approaching person can recognize the warning more appropriately and effectively.

In the notification system according to one aspect, the ultrasonic irradiation control unit may adjust at least one of an interval for intermittently generating the ultrasonic wave, an intensity of the ultrasonic wave, and a position for irradiating the ultrasonic wave according to the distance information.

According to the above configuration, the closer to a predetermined area such as a dangerous area, the stronger the warning is given to the approaching person, so that the entry into the predetermined area can be effectively suppressed.

The notification system according to one aspect may include a ToF camera that serves as both the proximity sensor and the image sensor.

According to the above configuration, the proximity sensor and the image sensor can be realized by one sensor, and the configuration and arrangement become simpler.

In the notification system according to one aspect, the proximity sensor may be a light curtain.

According to the above configuration, even in a notification system using the light curtain, it is possible to give a warning that can be appropriately and effectively recognized by the approaching person by a tactile sensation.

In the notification system according to one aspect, at least one of the proximity sensor and the image sensor, and the ultrasonic irradiation device may respectively have three or more markers on a reference surface and a positional relationship between at least the proximity sensor or the image sensor and the ultrasonic irradiation device can be determined from an image obtained by photographing the three or more markers on each of the reference surfaces.

According to the above configuration, the positional relationship between the sensor and the ultrasonic irradiation device can be grasped, and the portion of the body of the approaching person can be accurately irradiated with the ultrasonic wave.

A notification device according to one aspect of the present invention includes a proximity sensor control unit, an image sensor control unit, a person detection unit, and an ultrasonic irradiation control unit. The proximity sensor control unit acquires distance information to an object from a proximity sensor that detects an approach of the object to a predetermined area; the image sensor control unit acquires image information of the object from an image sensor that captures an image; when the object approaching the predetermined area within a predetermined range is a person, the person detection unit detects a portion of a body of the person from the distance information and the image information; and the ultrasonic irradiation control unit causes an ultrasonic irradiation device, which remotely irradiates a portion of a body of a person with an ultrasonic wave that can generate a tactile sensation, to irradiate the portion of the body of the person detected by the person detection unit with the ultrasonic wave.

According to the above configuration, it is possible to realize a notification system that can appropriately and effectively make the approaching person recognize a warning when the person approaches a predetermined area such as a dangerous area or the like in a factory or the like.

In the notification device according to one aspect, an irradiation portion selection unit may be further arranged, and the irradiation portion selection unit may select, from a plurality of portions of the body of the person detected by the person detection unit, the portion of the body of the person to be irradiated with the ultrasonic wave by the ultrasonic irradiation control unit according to a priority order determined previously.

According to the above configuration, a more desirable portion of the body can be selected, which allows the approaching person to appropriately and effectively the warning even when a part of the approaching person is hidden by an obstacle.

The present invention is not limited to each of the embodiments described above, various modifications can be made within the scope of the claims, and embodiments obtained by appropriately combining the technical means disclosed in each of the different embodiments are also included in the technical scope of the present invention.

What is claimed is:

1. A notification system, comprising:
   a proximity sensor that detects an approach of an object to a predetermined area;
   an image sensor that captures an image;
   an ultrasonic irradiation device that remotely irradiates a portion of a body of a person with an ultrasonic wave that can generate a tactile sensation; and
   a notification device equipped with a proximity sensor control unit, an image sensor control unit, a person detection unit, and an ultrasonic irradiation control unit;
   wherein the proximity sensor control unit acquires distance information to the object from the proximity sensor;
   the image sensor control unit acquires image information of the object from the image sensor;
   when the object approaching the predetermined area within a predetermined range is a person, the person detection unit detects a portion of a body of the person from the distance information and the image information;

wherein at least one of the proximity sensor and the image sensor, and the ultrasonic irradiation device respectively have three or more markers on a reference surface;

a positional relationship between the ultrasonic irradiation device and at least one of the proximity sensor and the image sensor can be determined from an image obtained by photographing three or more markers on each of the reference surfaces; and the ultrasonic irradiation control unit causes the ultrasonic irradiation device to irradiate the portion of the body of the person detected by the person detection unit with the ultrasonic wave according to the positional relationship between the ultrasonic irradiation device and at least one of the proximity sensor and the image sensor.

2. The notification system according to claim 1, wherein the notification device is further equipped with an irradiation portion selection unit; and the irradiation portion selection unit selects, from a plurality of portions of the body of the person detected by the person detection unit, the portion of the body of the person to be irradiated with the ultrasonic wave by the ultrasonic irradiation device according to a priority order determined previously.

3. The notification system according to claim 1, wherein the ultrasonic irradiation control unit causes the ultrasonic irradiation device to intermittently generate the ultrasonic wave, and thereby intermittently generates a tactile sensation in the portion of the body of the person.

4. The notification system according to claim 3, wherein the ultrasonic irradiation control unit adjusts at least one of an interval for intermittently generating the ultrasonic wave, an intensity of the ultrasonic wave, and a position for irradiating the ultrasonic wave according to the distance information.

5. The notification system according to claim 1, further comprising a ToF camera that serves as both the proximity sensor and the image sensor.

6. The notification system according to claim 1, wherein the proximity sensor is a light curtain.

7. A notification device, comprising: a proximity sensor control unit, an image sensor control unit, a person detection unit, and an ultrasonic irradiation control unit;

wherein the proximity sensor control unit acquires distance information to an object from a proximity sensor that detects an approach of the object to a predetermined area;

the image sensor control unit acquires image information of the object from an image sensor that captures an image;

when the object approaching the predetermined area within a predetermined range is a person, the person detection unit detects a portion of a body of the person from the distance information and the image information;

wherein at least one of the proximity sensor and the image sensor, and the ultrasonic irradiation device respectively have three or more markers on a reference surface;

a positional relationship between the ultrasonic irradiation device and at least one of the proximity sensor and the image sensor can be determined from an image obtained by photographing three or more markers on each of the reference surfaces; and the ultrasonic irradiation control unit causes an ultrasonic irradiation device, which remotely irradiates a portion of a body of a person with an ultrasonic wave that can generate a tactile sensation, to irradiate the ultrasonic wave to the portion of the body of the person detected by the person detection unit with the ultrasonic wave according to the positional relationship between the ultrasonic irradiation device and at least one of the proximity sensor and the image sensor.

8. The notification device according to claim 7, wherein an irradiation portion selection unit is further arranged; and the irradiation portion selection unit selects, from a plurality of portions of the body of the person detected by the person detection unit, the portion of the body of the person to be irradiated with the ultrasonic wave by the ultrasonic irradiation control unit according to a priority order determined previously.

* * * * *